(12) United States Patent
Prebil et al.

(10) Patent No.: US 9,358,764 B2
(45) Date of Patent: Jun. 7, 2016

(54) SYSTEM AND METHOD OF JOINING COMPONENTS

(71) Applicant: The Boeing Company, Chicago, IL (US)

(72) Inventors: Charles R. Prebil, University City, MO (US); James R. Fox, University City, MO (US)

(73) Assignee: The Boeing Company, Chicago, IL (US)

(*) Notice: Subject to any disclaimer, the term of this patent is extended or adjusted under 35 U.S.C. 154(b) by 166 days.

(21) Appl. No.: 14/183,006

(22) Filed: Feb. 18, 2014

(65) Prior Publication Data

US 2015/0165746 A1    Jun. 18, 2015

Related U.S. Application Data

(60) Provisional application No. 61/917,336, filed on Dec. 17, 2013.

(51) Int. Cl.
*B32B 37/15* (2006.01)
*B32B 37/18* (2006.01)
(Continued)

(52) U.S. Cl.
CPC .............. *B32B 37/15* (2013.01); *B29C 65/02* (2013.01); *B29C 65/4815* (2013.01); *B29C 65/5021* (2013.01); *B29C 65/5057* (2013.01); *B29C 65/5078* (2013.01); *B29C 66/02241* (2013.01); *B29C 66/112* (2013.01); *B29C 66/131* (2013.01); *B29C 66/43441* (2013.01); *B29C 66/474* (2013.01); *B29C 66/524* (2013.01); *B29C 66/721* (2013.01); *B29C 66/7392* (2013.01); *B32B 37/02* (2013.01);

(Continued)

(58) Field of Classification Search
CPC  B29C 65/02; B29C 65/4815; B29C 65/5057; B29C 65/5065; B29C 66/02241; B29C 66/112; B29C 66/131; B29C 66/43441; B29C 66/474; B29C 66/524; B29C 66/721; B29C 66/7392; B32B 37/02; B32B 37/15; B32B 37/18; B32B 41/00
USPC .......................................................... 156/64
See application file for complete search history.

(56) References Cited

U.S. PATENT DOCUMENTS 5,264,059 A    11/1993  Jacaruso et al.
6,174,392 B1 *  1/2001  Reis ........................ B29C 73/06
                                                          156/58

(Continued)

FOREIGN PATENT DOCUMENTS

WO    WO2012156525 A1    11/2012

OTHER PUBLICATIONS

EP14191514, European Search Report, dated Jun. 1, 2015.
(Continued)

*Primary Examiner* — George Koch

(57) ABSTRACT

A method of forming a structural assembly may include providing a first component and a second component to be joined together. The method may additionally include scanning a contour of a first mating surface of the first component and scanning a contour of a second mating surface of the second component. The method may further include producing a thermoplastic element having opposing first and second element surfaces substantially matching a contour of the first mating surface and the second mating surface.

20 Claims, 13 Drawing Sheets

(51) Int. Cl.
  *B32B 37/02* (2006.01)
  *B32B 41/00* (2006.01)
  *B29C 65/48* (2006.01)
  *B29C 65/50* (2006.01)
  *B29C 65/00* (2006.01)
  *B29C 65/02* (2006.01)

(52) U.S. Cl.
  CPC ............... B32B 37/18 (2013.01); B32B 41/00 (2013.01); *B29C 66/3494* (2013.01); *B29C 66/72141* (2013.01); *B29C 66/72143* (2013.01); *B29C 66/7394* (2013.01); *B29C 66/73755* (2013.01); *B29C 66/73921* (2013.01); *B29C 66/73941* (2013.01); *B29C 66/81455* (2013.01); *B29C 66/82423* (2013.01); *B29C 66/8322* (2013.01); *B29C 66/83221* (2013.01); *B29C 66/919* (2013.01); *B29C 66/91411* (2013.01); *Y10T 156/10* (2015.01)

(56) References Cited

U.S. PATENT DOCUMENTS

| | | | | |
|---|---|---|---|---|
| 7,208,057 B2* | 4/2007 | Weisser | ............... | B29C 65/52 156/286 |
| 2003/0154801 A1* | 8/2003 | Georgeson | ............. | G01N 29/11 73/799 |
| 2004/0236454 A1* | 11/2004 | Weisser | ................. | B29C 65/52 700/123 |
| 2009/0154775 A1* | 6/2009 | Lea | ........................ | G01B 11/14 382/108 |
| 2011/0139932 A1* | 6/2011 | Matheson | ............... | B64C 3/182 244/132 |
| 2012/0148789 A1* | 6/2012 | Hallander | ......... | B29C 66/73711 428/113 |
| 2013/0344291 A1* | 12/2013 | Pearson | ................ | B29C 70/865 428/157 |
| 2014/0079903 A1 | 3/2014 | Hugon et al. | | |
| 2014/0216638 A1* | 8/2014 | Vetter | ................ | B29D 99/0014 156/227 |

OTHER PUBLICATIONS

Canadian Appl. No. 2,869,596, Canadian Office Action dated Nov. 24, 2015.

U.S. Appl. No. 13/693,958 entitled Joining Composite Components Using Low Temperature Thermoplastic Film Fusion, filed Dec. 4, 2012.

* cited by examiner

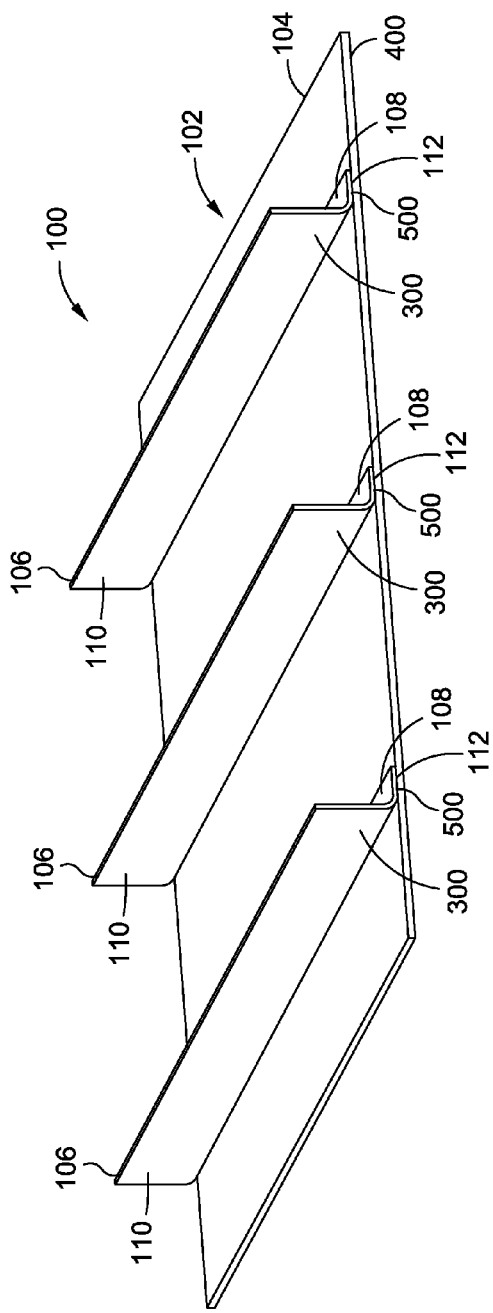
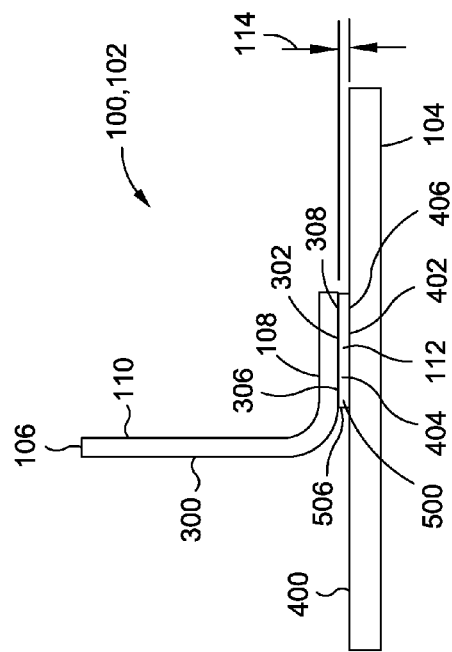

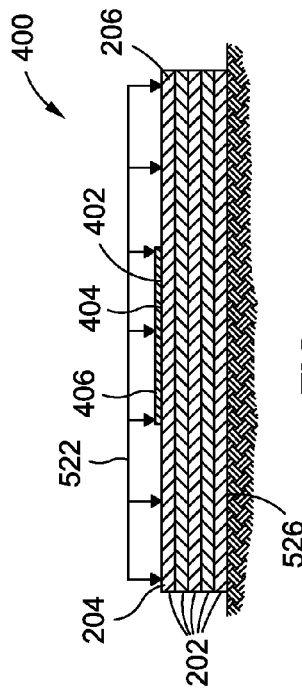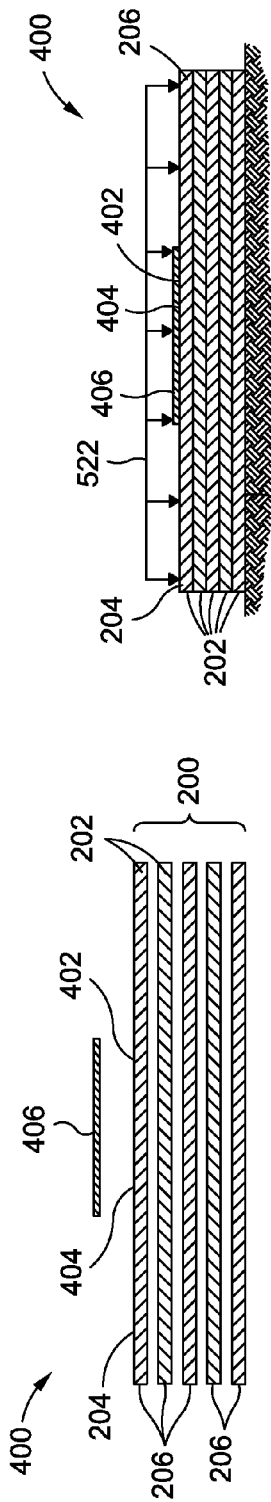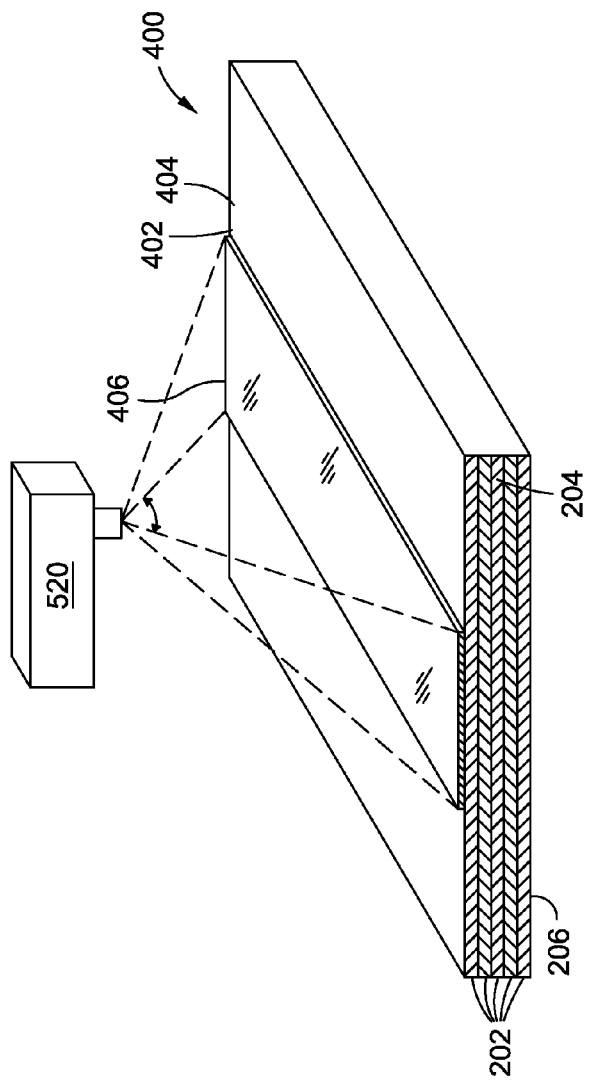

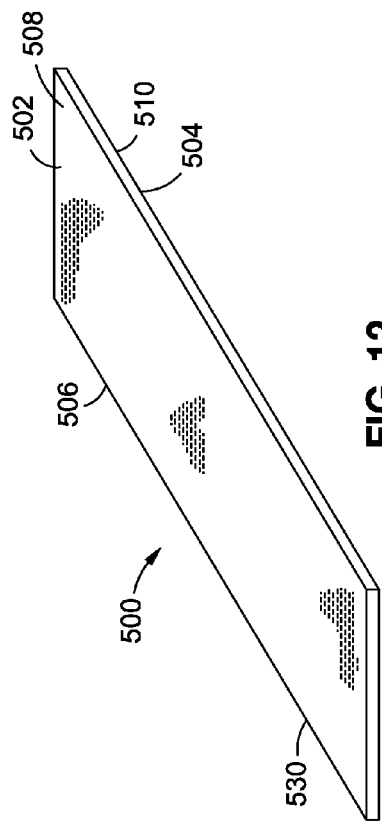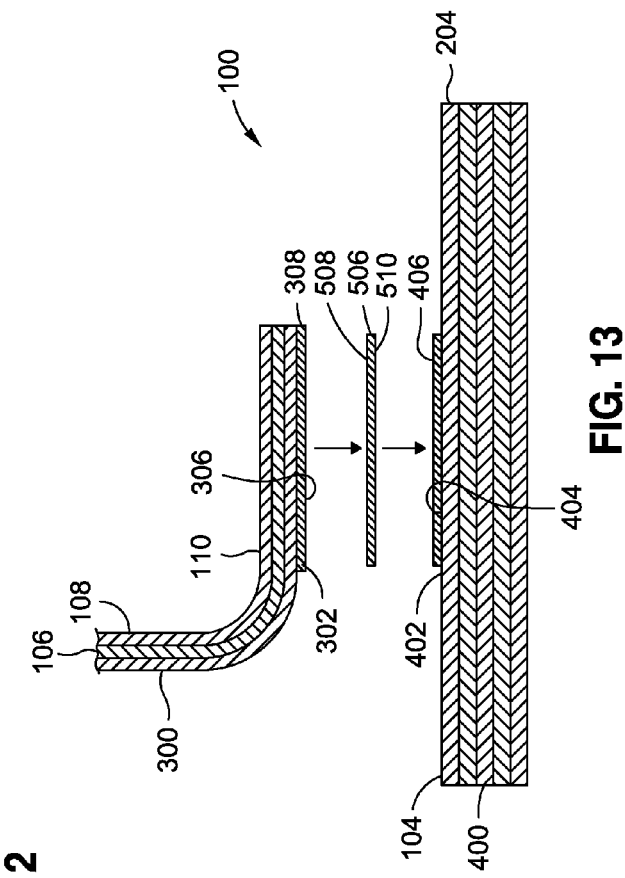

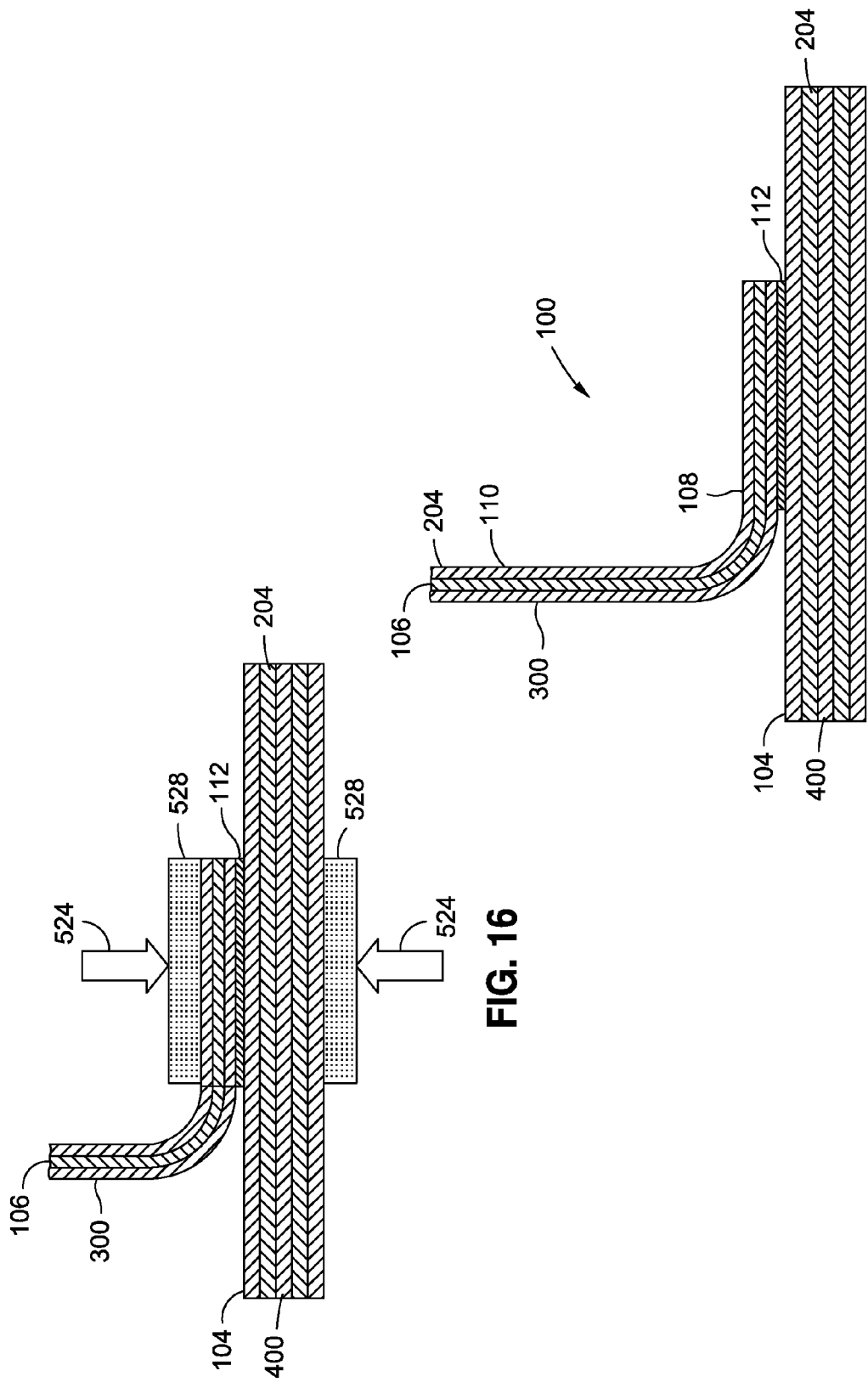

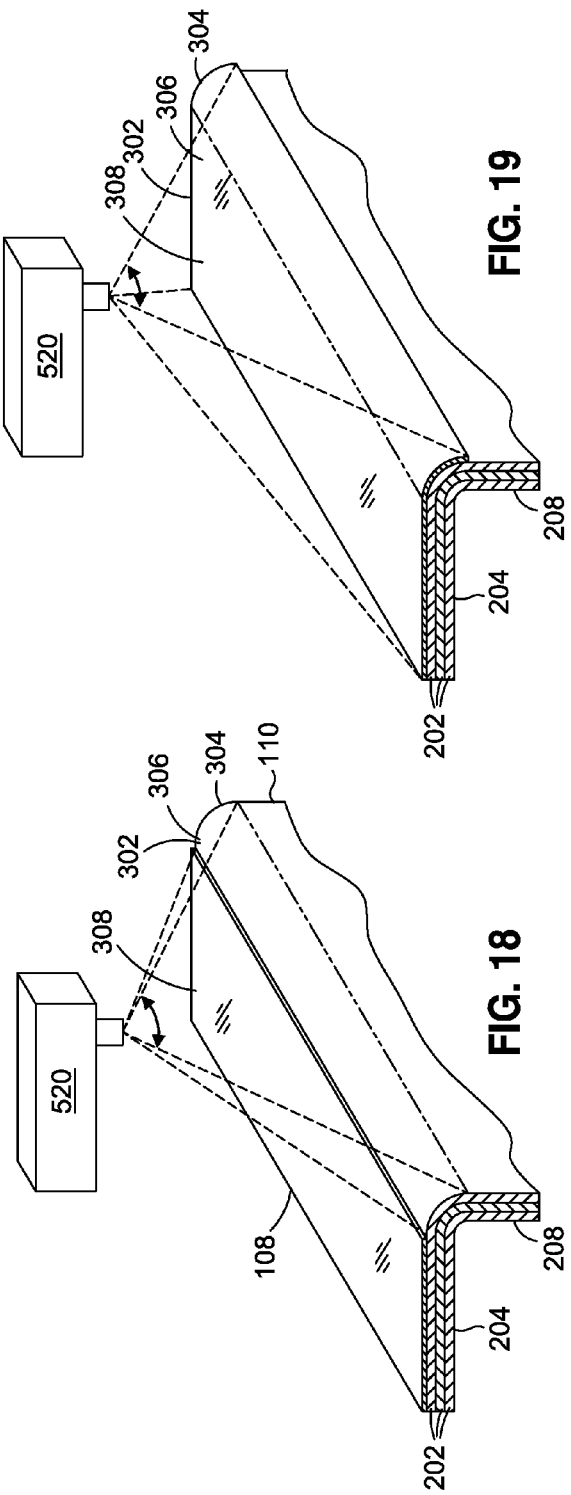
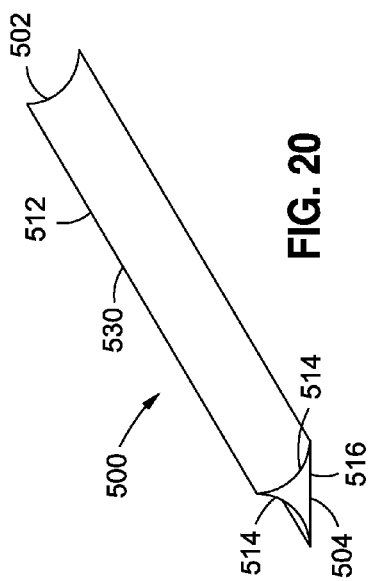
FIG. 18
FIG. 19
FIG. 20

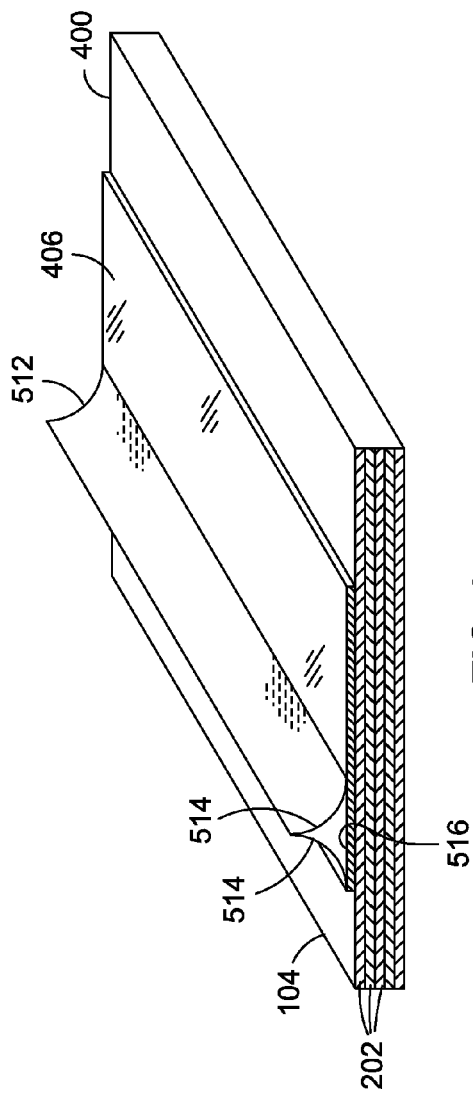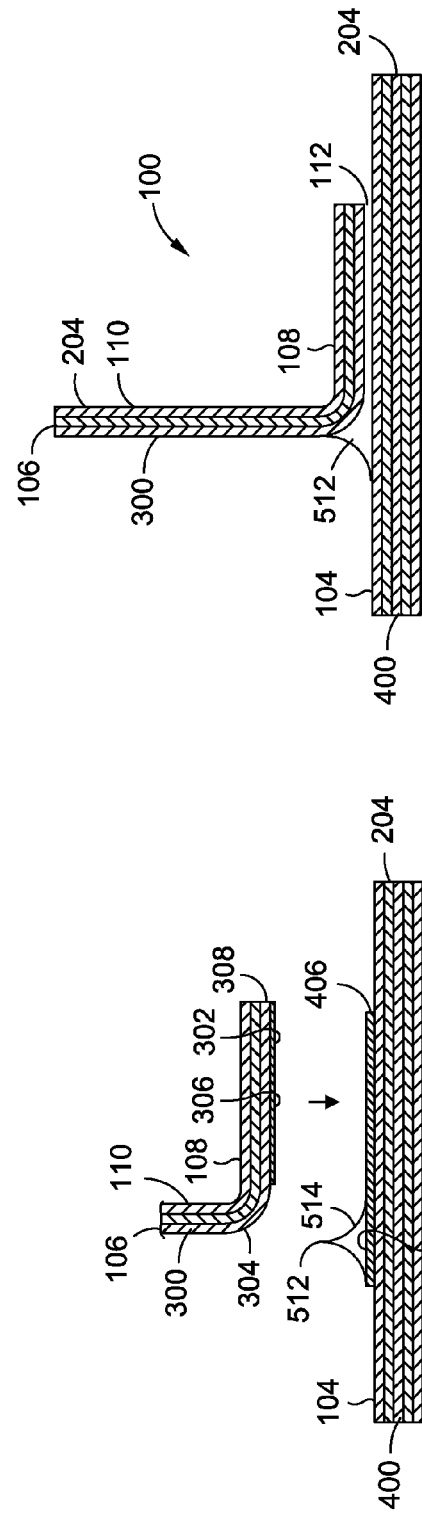

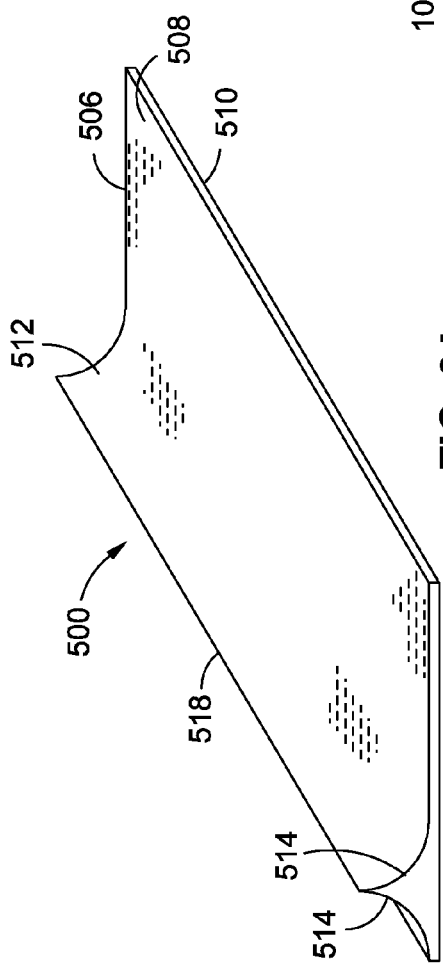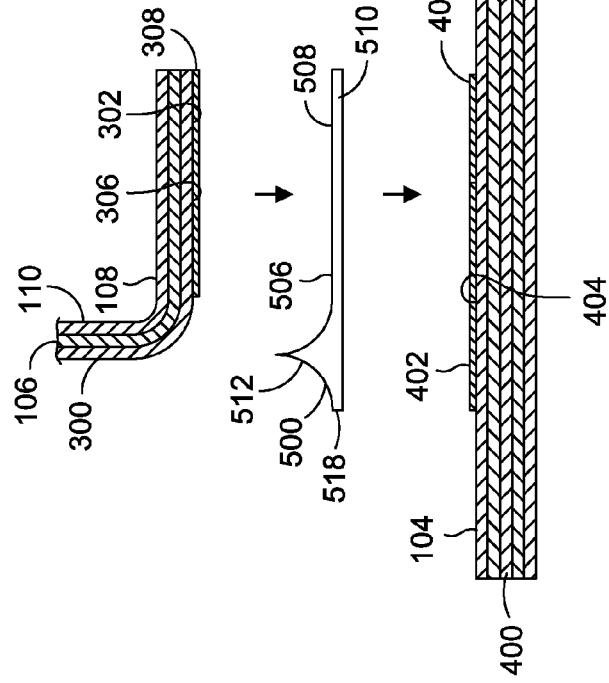

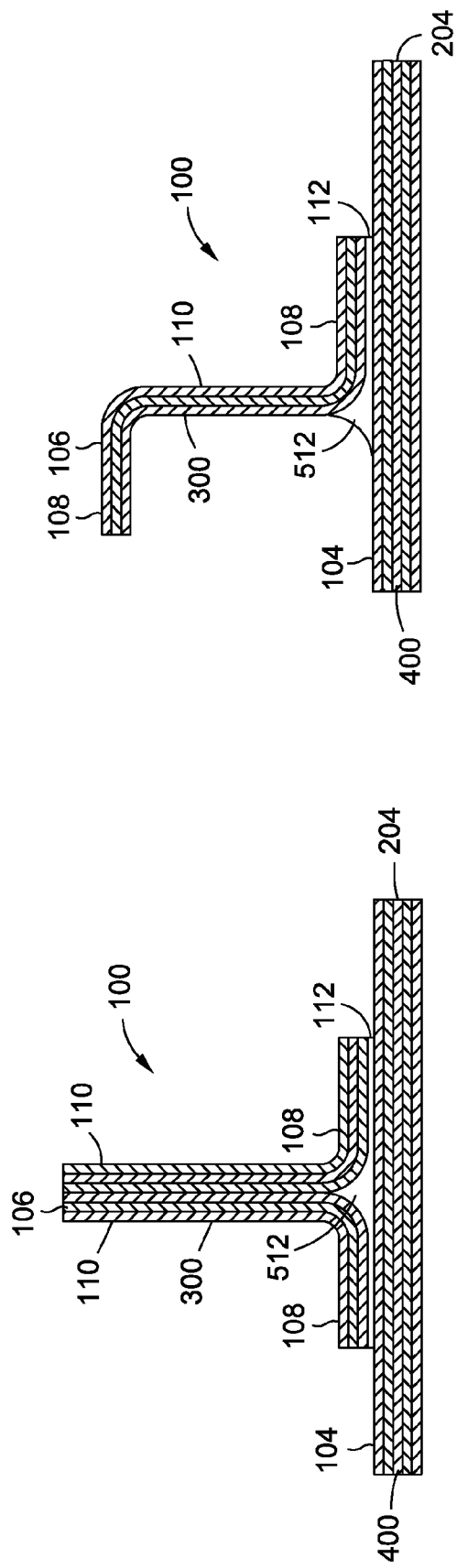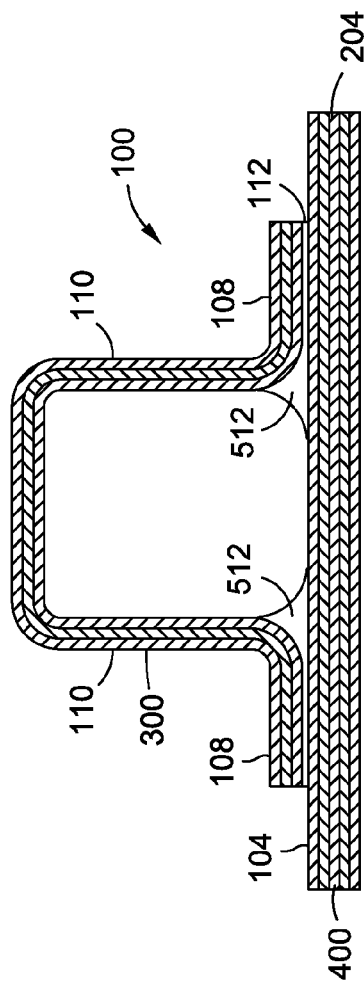

SYSTEM AND METHOD OF JOINING COMPONENTS

CROSS-REFERENCE TO RELATED APPLICATIONS

This application claim priority to Provisional Application No. 61/917,336 entitled SYSTEM AND METHOD OF JOINING components filed on Dec. 17, 2013, the entire contents of which is incorporated by reference herein.

FIELD

The present disclosure relates generally to processes for joining structural components and, more particularly, to processes for joining components using thermoplastic films.

BACKGROUND

Composite materials and components are used in ever-increasing amounts in a wide variety of applications. For example, commercial aircraft are incorporating increasing amounts of composite materials into primary structure and secondary structure due to the favorable mechanical properties of composite materials. Such favorable mechanical properties may allow for a reduction in weight and an increase in payload capacity and fuel efficiency of an aircraft. In addition, the use of composite materials may extend the service life of the aircraft.

Laminated composite components may be joined together using several techniques. For example, composite components may be joined using mechanical fasteners which may require drilling fastener holes in the components using specialized drill bits. Following the drilling of the fasteners holes, disassembly of the composite components may be required to allow for de-burring and/or inspection of each fastener hole, followed by re-assembly of the composite components. Mechanical fasteners may be installed in the fastener holes and the fasteners may be tightened to a predetermined torque value. As may be appreciated, the use of mechanical fasteners for joining composite components may require multiple steps resulting in a time-consuming and labor-intensive process.

Composite components may also be joined together without mechanical fasteners by bonding the components together using an adhesive. The adhesive may be applied between the mating surfaces of the composite components to form a bond joint. The bond joint has a bondline thickness which ideally is relatively thin to minimize stress concentrations along the edges of the bond joint and to improve the shear strength and tensile strength of the bond joint. Occasionally, the mating surfaces of one or both of the composite components may have mismatched contours resulting in gaps in the bond joint.

Prior art methods of filling gaps between the mating surfaces of the composite components may include applying extra adhesive material between the mating surfaces and allowing the adhesive to flow into the gaps during the joining process. However, the extra adhesive material may increase the bondline thickness which may undesirably affect the strength properties of the bond joint. In another approach for filling gaps, specialized tooling may be developed for applying high compressive forces on the bond joint to push out the gaps between the mating surfaces. However, specialized tooling may increase overall manufacturing costs. In addition, the high compressive forces applied by specialized tooling may induce undesirable stresses in the composite components.

As can be seen, there exists a need in the art for a system and method for joining composite components which accommodates variations in the contours of the mating surfaces of the composite components while minimizing the bondline thickness.

SUMMARY

The above-noted needs associated with joining composite components are specifically addressed by the present disclosure which provides methods of forming a structural assembly. In an embodiment, the method may include providing a first component and a second component to be joined together. The method may additionally include scanning a contour of a first mating surface of the first component and scanning the contour of a second mating surface of the second component. The method may further include producing a thermoplastic element having opposing first and second element surfaces that substantially match the contour of the respective first and second mating surface.

In a further embodiment, disclosed is a method of joining components including providing a first component having a first thermoplastic film applied to a first mating surface. The method may also include providing a second component having a second thermoplastic film applied to a second mating surface. The method may include scanning the first thermoplastic film and the second thermoplastic film to determine a contour thereof. The method may additionally include producing a thermoplastic sheet from material that is substantially similar to the first thermoplastic film and/or the second thermoplastic film. The thermoplastic sheet may have a first sheet surface and a second sheet surface respectively matching the contour of the first mating surface and the second mating surface. The method may further include assembling the first component and the second component with the thermoplastic sheet sandwiched therebetween, and applying heat and compactive pressure to the thermoplastic sheet, the first thermoplastic film, and/or the second thermoplastic film. The method may also include fusing together the thermoplastic sheet, the first thermoplastic film, and the second thermoplastic film to join the first component to the second component to form a structural assembly.

Also disclosed is a method of joining components including providing a first component having a first thermoplastic film. The first mating surface may include a first radius surface. The method may also include providing a second component having a second thermoplastic film. The first mating surface may include a first radius surface. The method may further include producing a thermoplastic radius filler having a radius filler side surface and a radius filler base surface substantially matching a respective contour of the first radius surface and the second mating surface. The method may additionally include assembling the first component, the second component, and the thermoplastic radius filler and applying heat and compactive pressure to the thermoplastic radius filler, the first thermoplastic film, and/or the second thermoplastic film. The application of heat and/or compactive pressure may result in fusing together the first thermoplastic film, the second thermoplastic film, and/or the thermoplastic radius filler to join the first component to the second component to form a structural assembly The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a perspective illustration of an example of a structural assembly configured as a stiffened panel having a skin and a plurality of L-shaped stiffeners which may each be joined to the skin using one or more thermoplastic elements in a low-melt thermoplastic joining process disclosed herein;

FIG. 3 is a sectional view of a stiffener joined to a skin using a thermoplastic element;

FIG. 6 is an exploded side view of a stack of composite plies and a thermoplastic film prior to co-consolidation thereof to form an example of a second component;

FIG. 7 is a side view of the assembled stack of plies and the thermoplastic film during the application of consolidation pressure and heat to form the second component as a laminated composite skin;

FIG. 8 is a perspective illustration of a scanner scanning the thermoplastic film of the second component;

FIG. 12 is a perspective illustration of a thermoplastic element configured as a thermoplastic sheet formed with opposing sheet surfaces that may be contoured to substantially match the contour of the first thermoplastic film and second thermoplastic film on the respective first component and second component;

FIG. 13 is an exploded side view of the first component and the second component with the thermoplastic sheet positioned therebetween;

FIG. 16 is a side view of the application of heat and pressure to fuse together the thermoplastic sheet, the first thermoplastic film, and the second thermoplastic film and forming a thermoplastic joint to join the first component to the second component;

FIG. 17 is a side view of the integrated structural assembly showing the thermoplastic joint joining the first component and the second component;

FIG. 18 is a perspective illustration of a scanner scanning a first radius surface of the first component;

FIG. 19 is a perspective illustration of a scanner scanning a thermoplastic film covering the first radius surface;

FIG. 20 is a perspective illustration of computer model of a radius filler based on contour data generated by scanning the first radius surface;

FIG. 21 is a perspective illustration of a thermoplastic element configured as a thermoplastic radius filler, and wherein the thermoplastic radius filler is additively manufactured onto the second thermoplastic film of the second component;

FIG. 22 is an exploded side view of the first component being assembled with the second component with the thermoplastic radius filler positioned therebetween;

FIG. 23 is a side view of an integrated structural assembly showing the thermoplastic radius filler fused with the thermoplastic film joining the first component and the second component;

FIG. 24 is a perspective illustration of a thermoplastic radius filler and a thermoplastic sheet integrally formed as a unitary structure;

FIG. 25 is a side view of an exploded side view of the integrated thermoplastic radius filler and thermoplastic sheet positioned between the first opponent and the second component;

FIG. 26 is a side view of an integrated structural assembly including a thermoplastic joint having a thermoplastic radius filler and joining back-to-back L-shaped stiffeners to a skin;

FIG. 27 is a side view of an integrated structural assembly including a thermoplastic joint having a radius filler and joining a Z-shaped stiffener to a skin; and FIG. 28 is a side view of an integrated structural assembly including a thermoplastic joint having a pair of radius fillers and joining a hat-shaped stiffener to a skin.

DETAILED DESCRIPTION

Figure 1:
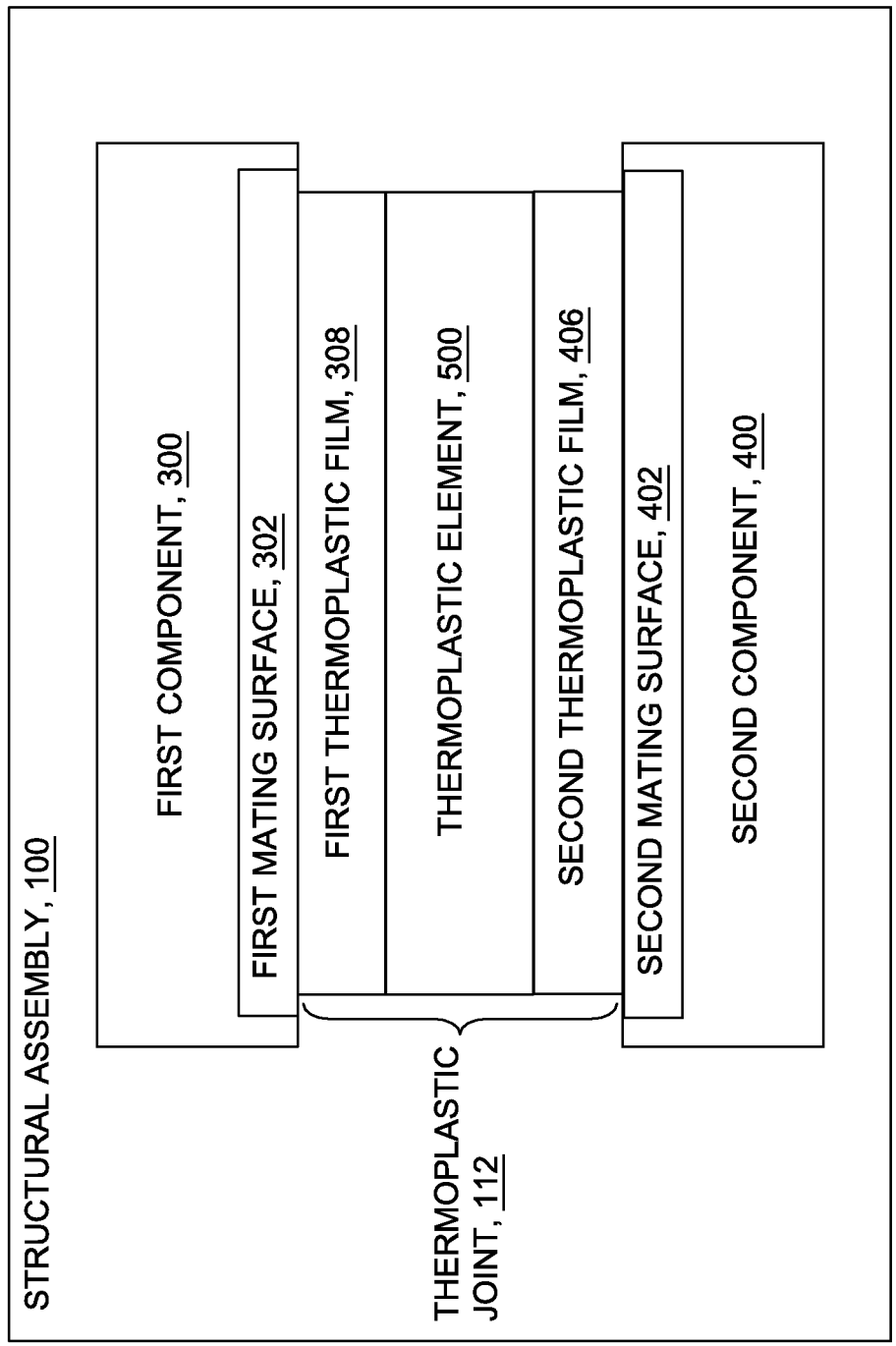
FIG. 1 is an illustration of a block diagram of a structural assembly including a first component joined to a second component by a thermoplastic element having element surfaces that may be contoured to substantially match the contour of the respective mating surface of the first component and the second component.

Referring now to the drawings wherein the showings are for purposes of illustrating preferred and various embodiments of the disclosure, shown in FIG. 1 is a block diagram of a structural assembly 100 including a first component 300 joined to a second component 400 using a thermoplastic element 500. In an embodiment, the thermoplastic element 500 may be configured as a thermoplastic sheet 506 (FIG. 12). In other embodiments, the thermoplastic element 500 may be configured as a thermoplastic radius filler 512 (FIG. 20) as described below, or as a combination thermoplastic sheet 506/thermoplastic radius filler 512 formed as a unitary structure 518 (FIG. 24).

In some examples, a thermoplastic sheet 506 (FIG. 12) may include opposing sheet surfaces 508, 510. At least one of the sheet surfaces 508, 510 may be contoured to substantially match the contour of the first component 300 and/or the second component 400. For example, the thermoplastic sheet 506 may include a first sheet surface 508 (FIG. 12) that may be contoured to substantially match the contour of a first thermoplastic film 306 (FIGS. 9-11) that may be provided with the first component 300. The first thermoplastic film 306 may be a relatively thin film that may be applied to the first mating surface 302 (FIG. 9) of the first component 300 prior to joining the first component 300 to the second component 400. For example, the first thermoplastic film 306 may be directly applied to the first mating surface 302 of the first component 300 and may be co-consolidated or co-cured with one or more composite plies 202 (FIG. 9) to form a laminated composite first component 300.

In the present application, a composite component (e.g., a first component 300, a second component 400, etc.) may be described as a component formed of fiber-reinforced polymer matrix material. In some examples, the composite component may include substantially continuous fibers embedded within a matrix material. The fibers may be provided in any one of a variety of arrangements such as unidirectional fibers, bidirectional fibers, or other fiber arrangements. In another example, the fibers may be non-continuous fibers such as short fibers or chopped fibers arranged in any orientation such as in random orientations. In other embodiments, the first and/or second component 300, 400 may be provided as a hybrid composite laminate (not shown) having composite layers and non-composite layers (e.g., metallic layers, ceramic layers) to form a fiber-metal laminate. For example, the first and/or second component 300, 400 may be provided as a fiber-metal laminate having alternating fiberglass layers and metallic layers. In some examples, the first and/or second component 300, 400 may be formed of non-composite material such as metallic material, ceramic material, and/or other non-composite materials or combinations thereof. A thermoplastic film 306, 406 may be applied to the mating surface of a non-composite first component 300 and/or to the mating surface of a non-composite second component 400 prior to joining the first and second components 300, 400 using a thermoplastic element 500 such as a thermoplastic sheet 506.

The first thermoplastic film 306 may be relatively thin such that when the first thermoplastic film 306 is applied to the first mating surface 302 of the first component 300, the contour of the first mating surface 302 may be transferred to or duplicated in the outer surface of the first thermoplastic film 306. The second thermoplastic film 406 (FIGS. 6-8) may also be a relatively thin film applied to the second mating surface 402 of the second component 400 such that the contour of the second mating surface 402 may be transferred to or duplicated in the outer surface of the second thermoplastic film 406. The thermoplastic sheet 506 may include a second sheet surface that may be contoured to match the contour of the second thermoplastic film 406 which may be provided with the second component 400.

The thermoplastic element 500 may facilitate the joining of the first component 300 to the second component 400 in a low-melt thermoplastic film joining process by applying heat to melt and fuse together the thermoplastic element 500, the first thermoplastic film 306, and the second thermoplastic film 406. In some examples where the first and/or second component 300, 400 are formed of composite material 204 such as thermoplastic material, heat may be applied in a manner to limit the temperature of the first and/or second component 300, 400 to below the melt temperature of the composite material 204. Maintaining the temperature of the first and/or second component 300, 400 below the melt temperature may avoid undesirable softening and/or re-melting of the pre-consolidated composite components. In this manner, the shape and integrity of the pre-consolidated composite components may be maintained. Although the present disclosure is described in the context of using a thermoplastic element 500 to join two (2) components (e.g., joining a first component 300 to a second component 400), the method disclosed herein may include using one or more thermoplastic elements 500 to join any number of components.

Compactive pressure 524 (see FIG. 16) may be applied to the thermoplastic element 500 and/or to the first and/or second thermoplastic film 306, 406 during the process of joining of the first component 300 to the second component 400. The compactive pressure 524 may be applied during the application of heat to the thermoplastic sheet 506, thermoplastic films 306, 406, and/or components 300, 400 during the process of joining of the first component 300 to the second component 400. Compactive pressure 524 may also be applied during cooling of the thermoplastic element 500, thermoplastic films 306, 406, and/or components 300, 400. In embodiments where the thermoplastic element 500 is configured as a thermoplastic sheet 506, the fusing together of the thermoplastic sheet 506 with the first and second thermoplastic film 306, 406 may result in a fused thermoplastic joint 112 (FIG. 17) joining the first component 300 to the second component 400.

As indicated above, prior to joining the components 300, 400, the thermoplastic element 500 may be formed or provided with element surfaces 502, 504 (FIG. 12) contoured to match the contour of the first component 300 and the second component 400. For example, where the thermoplastic element 500 is configured as a thermoplastic sheet 506 (FIG. 12), the thermoplastic sheet 506 may include sheet surfaces that may be contoured in a manner to accommodate variations and/or mismatches between the contour of the mating surface 302 of the first component 300 and the mating surface 402 of the second component 400. In this regard, the thermoplastic sheet 506 may accommodate variations in the bondline thickness 114 (FIG. 3) at different locations in the thermoplastic joint 112 between the first and second component 300, 400, and may thereby reduce or avoid the occurrence of voids or gaps (not shown) in the thermoplastic joint 112 between the first and second component 300, 400. In this regard, the use of one or more thermoplastic elements 500 in a low-melt thermoplastic film joining process may result in an improvement in the strength of the thermoplastic joint 112. For example, the use of one or more thermoplastic sheets 506 to join the first component 300 to the second component 400 may result in an improvement in the shear strength and/or tensile strength of the thermoplastic joint 112. The use of one or more thermoplastic elements 500 in a low-melt thermoplastic film joining process may also improve the durability and energy-absorbing capability of the thermoplastic joint 112 due to a reduction or avoidance of gaps in the thermoplastic joint 112.

Shown in FIG. 2 is an example of a structural assembly 100 configured as a panel 102. The panel 102 may include a skin 104 which may have a substructure for strengthening or stiffening the skin 104. The substructure may include a plurality of stiffeners 106 (e.g., a plurality of first components 300) which may be joined to the skin 104 (e.g., the second component 400) using one or more thermoplastic sheets 506 in a low-melt thermoplastic joining process. Each one of the stiffeners 106 is shown having an L-shaped cross-section including a web 110 and a flange 108 extending outwardly from the web 110. However, the stiffener 106 may be provided in any one of a variety of different cross-sectional shapes and is not limited to an L-shaped cross section. The skin 104 and the stiffeners 106 may each be formed of composite material 204 such as a fiber-reinforced thermoplastic material and/or fiber-reinforced thermoset material. However, as indicated above, the presently-disclosed joining process may be implemented for joining components formed of any type of material, without limitation, and is not limited to joining components formed of composite materials. In addition, the joining process may be implemented for joining components having any size, shape, and configuration, without limitation, and is not limited to joining a skin 104 and stiffener 106 as shown in FIG. 2.

Shown in FIG. 3 is a cross-sectional view of one of the stiffeners 106 joined to a portion of a skin 104. The flange 108 of the stiffener 106 (e.g., the first component 300) may include a first mating surface 302. The skin 104 (e.g., the second component 400) may include a second mating surface 402 that may be joined to the first mating surface 302 at a thermoplastic joint 112 using a thermoplastic sheet 506 in the joining process disclosed herein. The thermoplastic sheet 506 may accommodate actual variations in bondline thickness 114 at different locations in the thermoplastic joint 112 between the first component 300 and the second component 400. In addition, the use of low-melt thermoplastic material of the thermoplastic sheet 506 between the first component 300 and the second component 400 may fill gaps in the bondline, and may result in a relatively low overall bondline thickness 114. For example, the use of a thermoplastic sheet 506 in the joining process disclosed herein may result in a bondline thickness 114 of approximately 0.001 to 0.010 inch or more. The relatively thin bondline thickness 114 may reduce stress concentrations at the corners of the thermoplastic joint 112 which may improve the strength of the thermoplastic joint 112.

Figure 4A:
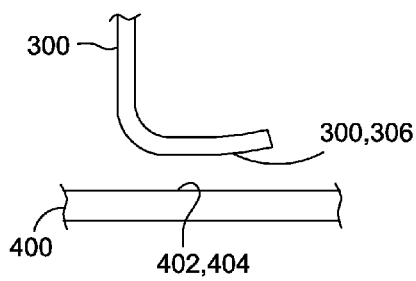
FIGS. 4A-4H are non-limiting examples of different types of mismatches that may occur between the contour of a first component (e.g., a stiffener) and the contour of a second component (e.g., a skin)
Figure 4B:
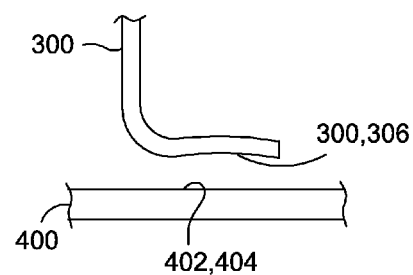
Figure 4C:
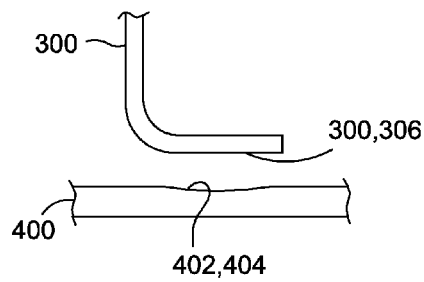
Figure 4D:
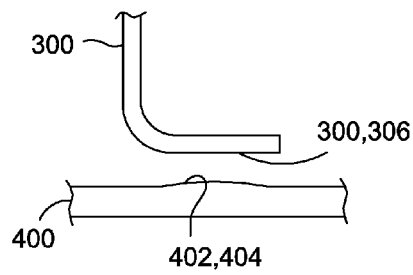
Figure 4E:
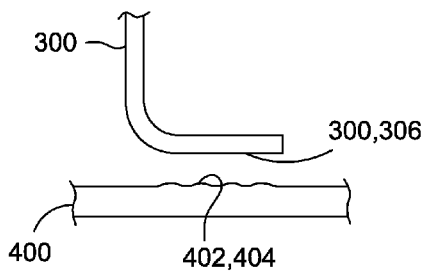
Figure 4F:
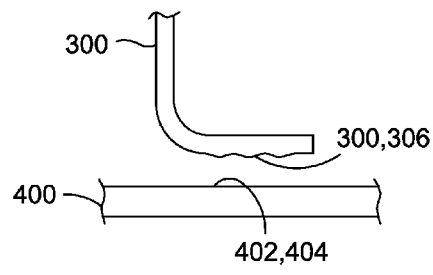
Figure 4G:
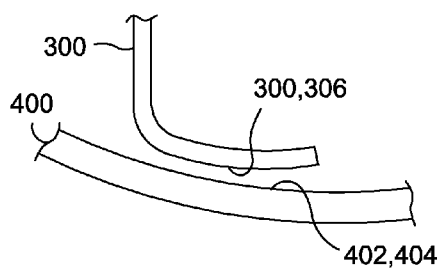
Figure 4H:
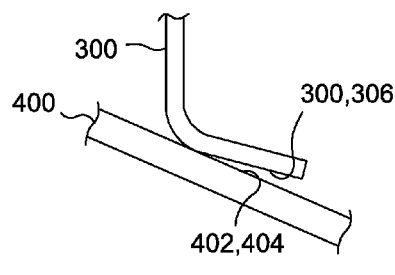

FIGS. 4A-4H illustrates some examples of different types of mismatches that may occur between the contour of a first component 300 and the contour of a second component 400, and which may be accommodated by the thermoplastic sheet 506 and thermoplastic joining process disclosed herein. However, as may be appreciated, the joining process may accommodate mismatches of any size, shape and configuration, and are not limited to the shown examples. FIG. 4A illustrates the edge of flange 108 being slightly raised up resulting in a gap between the flange edge and the skin 104 relative to other locations of the flange 108. FIG. 4B illustrates the middle of the flange 108 bowed upwardly resulting in an increased gap with the skin 104 at that location. FIG. 4C illustrates a depression formed in the panel 102 directly underneath the flange 108 resulting in an increase in gap size at the depression. FIG. 4D illustrates a bump formed in the panel 102 directly underneath the flange 108 resulting in a gap between the skin 104 and the flange on opposite sides of the bump. FIG. 4E illustrates the mating surface of the skin 104 having waves or wrinkles creating variations in bondline thickness 114 between the flange 108 and the skin 104. FIG. 4F illustrates the mating surface of the skin 104 having waves or wrinkles creating variations in bondline thickness 114. FIG. 4G illustrates the curvature of the flange 108 mismatched to the curvature of the panel 102 resulting in a variation in the bond line thickness. FIG. 4H illustrates a mismatch in the taper angle between the flange 108 and the skin 104.

Figure 5:
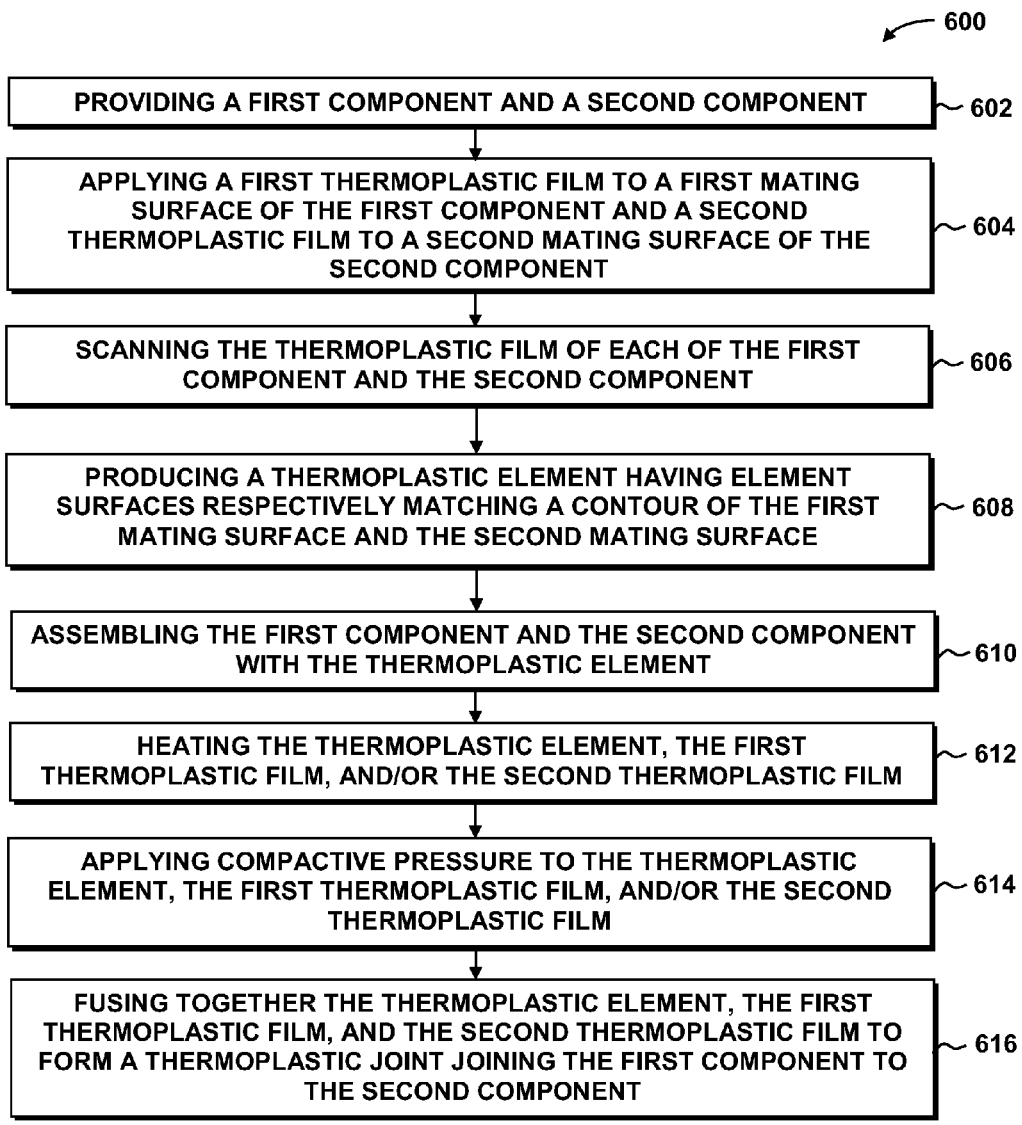
FIG. 5 is a flow chart illustrating one or more operations that may be included in a method of joining components.

Referring to FIG. 5 with additional reference to FIGS. 6-25, shown in FIG. 5 is a flow chart having one or more operations that may be included in a method 600 of joining components to form a structural assembly 100. Step 602 of the method 600 may include providing a first component 300 (FIG. 13) and a second component 400 (FIG. 13) to be joined together to form a structural assembly 100 (FIG. 17). The first component 300 may include a first mating surface 302 (FIG. 13) and the second component 400 may include a second mating surface 402 (FIG. 13) configured to be joined to the first mating surface 302. The first mating surface 302 may have a first contour 306. The second mating surface 402 may have a second contour 404. In some examples, the first contour 306 may have a mismatch with the second contour 404. In embodiments where the first component 300 and second component 400 are formed of thermoplastic material and/or thermoset material, the method may include forming the first component 300 and/or the second component 400 according to a process similar to the process disclosed in U.S. application Ser. No. 13/693,958 entitled JOINING COMPOSITE COMPONENTS USING LOW TEMPERATURE THERMOPLASTIC FILM FUSION filed on Dec. 4, 2012, the entire contents of which is incorporated by reference herein.

Figure 9:
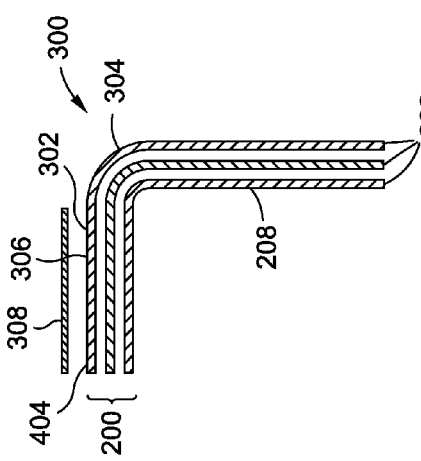
FIG. 9 is an exploded side view of a stack of plies of thermoplastic prepreg (or a stack of plies of thermoset prepreg) and a thermoplastic film prior to co-consolidation to form an example of a first component.
Figure 14:
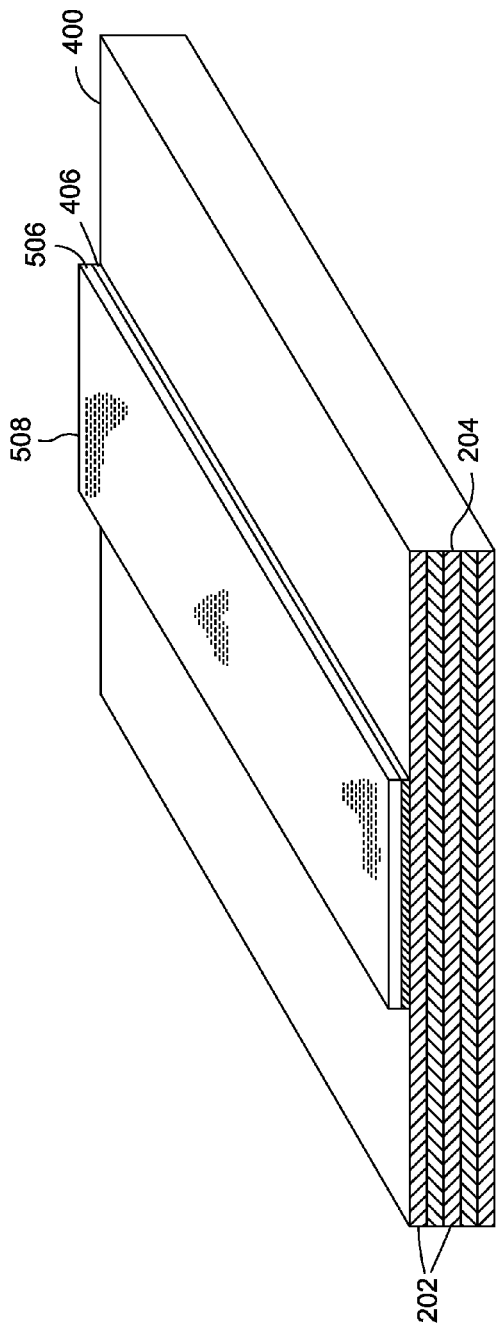
FIG. 14 is a perspective illustration of the thermoplastic sheet directly manufactured onto the thermoplastic film of the second component in an additive manufacturing process.

For example, to form the structural assembly 100 shown in FIG. 2, the method 600 may include forming the second component 400 from a stack 200 of plies 202 of thermoplastic prepreg 206 as shown in FIG. 6. The first component 300 may also be formed from a stack 200 of plies 202 of thermoplastic prepreg 206 as shown in FIG. 9. One or more of the plies 202 of thermoplastic prepreg 206 may include reinforcing fibers in a resin matrix. The resin matrix may be formed of organic material or inorganic material. In some examples, the resin matrix may be a thermoplastic polymer such as a polyaryletherketone resin, a polyetheretherketone resin, a polyetherketoneketone resin, or a polyphenylsulfone resin. The resin matrix may have a glass transition temperature and a melt temperature which may be higher than the glass transition temperature. The glass transition temperature may be the temperature at which the resin matrix softens. The melt temperature may be the temperature at which the molecules of the resin matrix become disordered. In some examples, the resin matrix may be a thermoplastic polymer having a melt temperature above approximately 500 degrees F.

In some examples, the first component 300 (FIG. 9) and/or the second component 400 (FIG. 6) may be formed by laying up a stack 200 of plies 202 of uncured thermoset prepreg 208 similar to that which is shown in FIGS. 6 and 9, and as disclosed in the above-mentioned application Ser. No. 13/693,958. The uncured thermoset prepreg 208 may include reinforcing fibers in a thermoset resin matrix such as epoxy resin. The thermoset resin matrix may have a curing temperature that may be lower than the glass transition temperature of the thermoplastic resin matrix. For example, thermoset resin matrix may have a curing temperature of less than approximately 400 degrees F., such as approximately 350 degrees F. or less. The plies 202 of thermoplastic prepreg 206 and/or the plies 202 of thermoset prepreg 208 may include reinforcing fibers such as unidirectional fibers, bi-directional fibers, or other fiber configurations or combinations of fiber configurations. The fibers may be formed of any material, without limitation, including glass, carbon, ceramic material, metallic material, and/or any type of organic material, inorganic material, or combinations thereof. The plies 202 in a stack 200 (FIGS. 6 and 9) may be arranged in predetermined fiber orientations according to a predetermined ply stacking sequence.

Step 604 of the method 600 may include applying a first thermoplastic film 306 to a first mating surface 302 of the first component 300 (see FIG. 9), and applying a second thermoplastic film 406 to a second mating surface 402 of the second component 400 (see FIG. 6). In some examples, the thermoplastic film 306, 406 may be formed of thermoplastic material that exhibits properties allowing the thermoplastic film to be co-consolidated with the mating surface of the first component 300 and/or second component 400. In this regard, the thermoplastic film 306, 406 may have a composition that is compatible with the thermoplastic resin matrix of the thermoplastic prepreg 206. In an embodiment, the thermoplastic film 306, 406 may be formed of thermoplastic material that is substantially similar to the resin matrix of the thermoplastic prepreg 206.

For embodiments where the first component 300 and/or second component 400 are formed of a stack 200 of plies 202 of thermoplastic prepreg 206, the method may include co-consolidating a thermoplastic film with thermoplastic prepreg 206 plies 202. For example, a first thermoplastic film 306 (FIG. 10) and/or a second thermoplastic film 406 (FIG. 7) may be laid up or applied to a respective first and/or second mating surface 402 of a respective first and/or second component 300, 400. The first component 300 and/or the second component 400 may be supported on consolidation tooling 526 that may approximate the intended final shape of the consolidated composite component 300, 400. Co-consolidation may include heating the thermoplastic prepreg 206 and the thermoplastic film 306, 406 to a temperature that is equal to or greater than the higher of the melt temperature of the thermoplastic film 306, 406 and the melt temperature of the resin matrix of the thermoplastic prepreg 206.

Heat may be applied by placing the lay-up of thermoplastic prepreg 206 and thermoplastic film 306, 406 in an autoclave or an oven. In some examples, heat may be applied by using heated tooling, infrared heating, radiation heating, hot-air heating, or other heating methods. Co-consolidation may also include applying consolidation pressure 522 to the thermoplastic film 306, 406 and the stack 200 of thermoplastic prepreg 206 plies 202 while applying heat. Consolidation pressure 522 may be applied to the thermoplastic film 306, 406 and the stack 200 of plies 202 using consolidation tooling 526, vacuum bagging, autoclave pressure, and/or other techniques. Application of heat and consolidation pressure 522 may result in the thermoplastic film 306, 406 and the thermoplastic prepreg 206 plies 202 being consolidated together into an integrated composite laminate component as shown in FIGS. 8 and 11.

Figure 10:
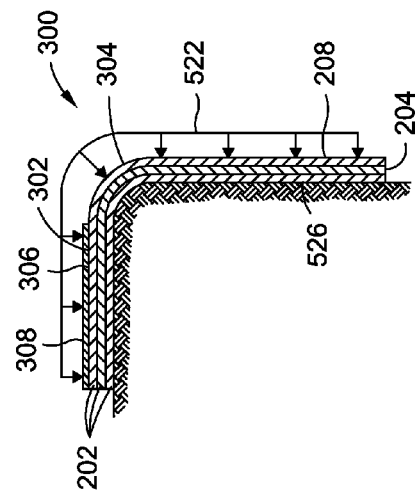
FIG. 10 is a side view of the assembled stack of plies thermoplastic prepreg and the thermoplastic film during the application of consolidation pressure and heat to form the first component as a laminated composite L-shaped stiffener.

For embodiments where the first component 300 and/or second component 400 are formed of thermoset prepreg 208, the method may include co-curing a thermoplastic film with a stack 200 of plies 202 of thermoset prepreg 208. In some embodiments, the thermoplastic film may be comprised of thermoplastic resin as described above. A thermoplastic film 306, 406 may be laid up or applied to the respective first and/or second mating surface 302, 402 of the respective first and/or second component 300, 400 as shown in FIGS. 7 and 10 in a manner described above. In some examples, the thermoplastic film 306, 406 may be comprised of a layer of epoxy applied to the mating surface of the outermost ply of thermoset prepreg 208 in the stack 200. The method may include heating the assembly of the thermoplastic film and the stack 200 of plies 202 of uncured thermoset prepreg 208 to a cure temperature of the thermoset resin. In some examples, the assembly may be heated to a temperature that is equal to or greater than a glass transition temperature of the thermoplastic film which may be greater than the cure temperature of the thermoset resin. Consolidation pressure 522 may be applied to the thermoplastic film and the uncured thermoset prepreg 208 while heating to the cure temperature of the thermoset resin to cure the assembly.

Figure 11:
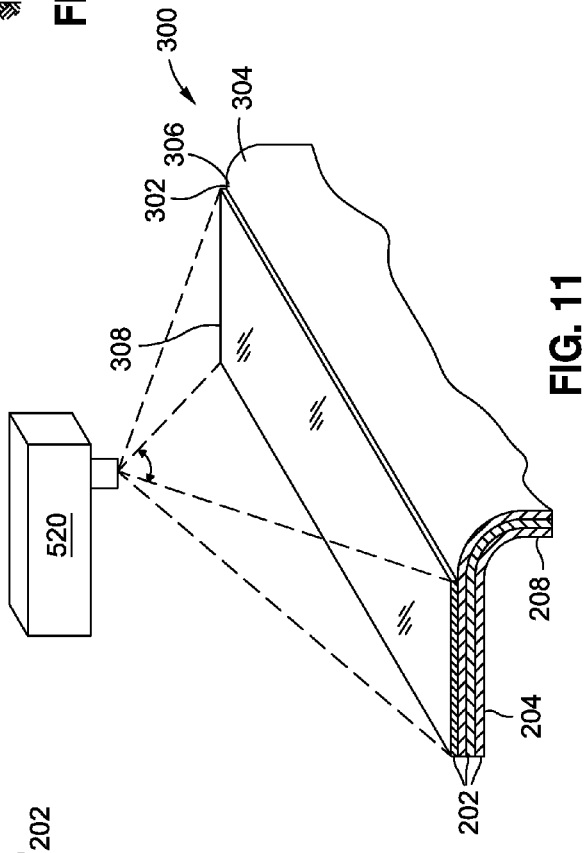
FIG. 11 is a perspective illustration of a scanner scanning the thermoplastic film of the first component.

Step 606 of the method 600 may include scanning (see FIG. 8) the second mating surface 402 of the second component 400 (FIG. 8) and scanning the first mating surface 302 of the first component 300 (FIG. 11) to map the contours of the first and second mating surface 302, 402 as shown in FIGS. 8 and 11. In this regard, the method 600 may include scanning the thermoplastic film on the mating surface of a co-consolidated thermoplastic component and/or scanning the thermoplastic film on the mating surface of a co-cured thermoset component as described above. The scanning of the first and/or second thermoplastic film 306, 406 covering the respective first and/or second mating surface 302, 402 may provide a means for mapping, measuring, and/or recording the contour of the mating surfaces 302, 402 so that a thermoplastic element 500 such as a thermoplastic sheet 506 may be produced having opposing sheet surfaces 508, 510 that respectively match the contour 306 404 of the mating surfaces 302, 402 of the first and second components 300, 400 to be joined. In some embodiments, the method may include digitally inspecting the mating surfaces and/or the thermoplastic films covering the mating surfaces. Digital inspection or digital scanning of the mating surfaces may be performed using any one of a variety of different techniques and devices.

For example, referring to FIGS. 8 and 11, shown are examples of a scanner 520 scanning the first thermoplastic film 306 (FIG. 11) and the second thermoplastic film 406 (FIG. 8) covering the respective first and second mating surfaces 302, 402 of the respective first and second components 300, 400. The scanner 520 may comprise an optical sensor, a digital scanner, a laser scanner, or other scanning system. In some examples, one or more optical sensors or scanners (not shown) may be mounted in a fixed position relative to the surface to be scanned. The optical sensors or scanners may optically scan along the length and/or width of the thermoplastic film to map, measure, and/or record the contour thereof. The optical sensors or scanners may be provided in any one of a variety of different configurations including, without limitation, any non-contacting scanner or optical measurement system or device which may use optics to measure the topography and/or contour of one or more of the mating surfaces and/or the thermoplastic films covering the mating surfaces of the one or more components.

In some examples, the scanning or measurement of contours may be performed by a scanner configured as a triangulation scanner and/or as a time-of-flight scanner. In some examples, laser scanners may collect three-dimensional positional data of a plurality of points (e.g., up to 100,000 or more points) to form one or more point clouds representative of the contour of one or more mating surfaces or the thermoplastic films covering the mating surfaces. The point cloud data may be recorded and stored such as in a computer memory. In an embodiment, a point cloud may be used to form a three-dimensional digital model or computer model 530 (e.g., FIGS. 12, 20, and 24) of the thermoplastic element 500 to be produced or manufactured for use in joining the first component 300 to the second component 400. In some embodiments, the method may include the use of one or more cameras to record images of the mating surfaces and/or thermoplastic films, and generate a three-dimensional model of the contour of each one of the mating surfaces to be joined together. The contour of the mating surfaces and/or thermoplastic films covering the mating surfaces may also be measured using one or more contact metrology devices such as a coordinate-measuring machine (CMM) or other contact-inspection device or technique.

The scanning of the contour of the mating surface(s) and/or thermoplastic film(s) may be performed relative to one or more datums (not shown) or reference features (not shown) that may be established. For example, although not shown, a reference feature such as a coordinate system, e.g., a Cartesian coordinate system, may be established on the outer surface of the skin 104 (e.g., the second component 400) in FIG. 8. The coordinate system (not shown) may be located at a corner of the second thermoplastic film 406 covering the second mating surface 402 of the second component 400. The coordinate system may be oriented such that the x-y axes of the coordinate system are coincident with a local plane of the outer surface of the skin 104, or, if the outer surface is non-planar, the coordinate system may be oriented such that the x-y axes are both tangent to the outer surface of the skin 104 at the corner of the second thermoplastic film 406. The z-axis of the coordinate system may extend outwardly from the outer surface of the second component 400. After establishing the location and orientation of the coordinate system, a digital scanner, a laser scanner, a camera, contour-measuring device, coordinate-measuring machine (CMM), or other device may measure and record the contour of the second thermoplastic film 406 relative to the coordinate system. A three-dimensional computer model 530 of the contour of the second thermoplastic film 406 may be generated and stored in a memory of a computer system (not shown).

In FIG. 11, the desired location and orientation of the stiffener 106 (e.g., a first component 300) may be defined relative to the second component (not shown). For example, a computer aided design (CAD) model (not shown) of the assembled first and second component 300, 400 may be available establishing the intended location and orientation of the second component 400 relative to the first component 300. The CAD model may thereby define the intended bondline thickness 114 between the first component 300 and second component 400 at one or more locations along a thermoplastic joint 112 to be formed between the first component 300 and the second component 400. In some examples, a determination may be made regarding the minimum and/or maximum bondline thickness 114 (e.g., the thickness tolerance) at any location along the thermoplastic joint 112.

A scanner 520, optical sensor, or other contour-measuring device may measure and record the contour of the first thermoplastic film 306 of the first component 300 relative to the above-mentioned coordinate system established on the second component 400. A computer model (not shown) of the contour of the first thermoplastic film 306 may be generated based on contour measurements from the scanner 520. The position and orientation of the three-dimensional computer model of the contour of the first thermoplastic film 306 may be defined relative to the established coordinate system on the second component 400, and may be stored in a computer system memory (not shown). The method may include using the computer models of the contour of the first and second thermoplastic film 306, 406 to generate a three-dimensional computer model 530 of a thermoplastic element 500 such as the thermoplastic sheet 506 illustrated in FIG. 12. The computer model 530 of the thermoplastic sheet 506 may have opposing first and second sheet surfaces 508, 510 that may substantially match the contour of the respective mating surfaces 302, 402 of the first and/or second component 300, 400 and/or the thermoplastic films 306, 406 covering the mating surfaces 302, 402. In addition, the computer model 530 of the thermoplastic sheet 506 may define the thickness of the thermoplastic sheet 506 which may vary at different locations along the thermoplastic joint 112. In this manner, the thermoplastic sheet 506 may accommodate thickness variations in the bondline between the first and second component 300, 400. Information may optionally be provided regarding a minimum thickness and a maximum thickness (e.g., thickness tolerance) of the thermoplastic sheet 506 and which may be later used for inspection and/or for structural analysis of the thermoplastic joint 112.

Step 608 of the method 600 of FIG. 5 may include producing or fabricating a thermoplastic element 500 having element surfaces 502, 504 that respectively match the contour of the first mating surface and the second mating surface. For example, the thermoplastic element 500 may be formed as a thermoplastic sheet 506 (FIG. 12) having opposing first and second sheet surfaces 508, 510 substantially matching the respective contours of the first and second mating surface 302, 402, or substantially matching the respective contours of the thermoplastic films 306, 406 covering the first and second mating surface 302, 402. In an embodiment, the method 600 may include producing the thermoplastic sheet 506 at a minimum thickness of approximately 0.002 inch or less. As indicated above, minimizing the bondline thickness 114 by minimizing the thickness of the thermoplastic sheet 506 may improve the strength properties of the thermoplastic joint 112 between the first component 300 and the second component 400. In some examples, the thermoplastic sheet 506 may be produced with a minimum thickness of approximately 0.005 inch or more which may improve producibility and/or handling of the thermoplastic sheet 506. In other examples, the thermoplastic sheet 506 may be produced with the thickness range of from approximately 0.002 to approximately 0.010 inch. However, thermoplastic sheet 506 may be provided in thicknesses greater than 0.010 inch.

Although the thermoplastic sheet 506 in FIG. 12 is shown as a generally flat, rectangularly-shape member, the thermoplastic sheet 506 may be provided in any size, shape, and configuration, without limitation, including curved (e.g., non-flat) shapes, bent shapes (e.g., non-flat), and other shapes and/or configurations, or combinations thereof. In addition, the thermoplastic sheet 506 may have a perimeter shape other than the rectangular shape shown in FIG. 12. Furthermore, multiple thermoplastic sheets 506 may be produced for a given thermoplastic joint. Multiple thermoplastic sheets 506 may be stacked on top of one another in a thermoplastic joint, and/or multiple thermoplastic sheets 506 may be arranged in side-by-side relation to one another to cover the area of a thermoplastic joint between two or more components to be joined.

The method 600 of joining components may include fabricating a thermoplastic element 500 such as a thermoplastic sheet 506 (FIG. 12) using direct manufacturing, rapid prototyping, or other techniques including, but not limited to, additive manufacturing such as three-dimensional printing, stereolithography, and direct digital manufacturing. In addition, the thermoplastic element 500 may be fabricated using subtractive manufacturing such as laser cutting, machining via computer numerical control (e.g., CNC machining), or other subtractive manufacturing techniques. The fabrication of the thermoplastic element 500 such as a thermoplastic sheet 506 may utilize a computer model 530 of the thermoplastic sheet 506 that may be generated with the aid of digital inspection or scanning of the contour of the first and second mating surfaces 302, 402 (or thermoplastic films) using one or more scanners, cameras, CMMs, or other contour-measuring device as discussed above. In some examples, the thermoplastic element 500 may be fabricated using molding techniques such as injection molding, compression molding, and other techniques.

In some examples, the thermoplastic element 500 (FIG. 12) may be formed of substantially the same material or similar material as the first thermoplastic film 306 (FIG. 13) and/or the second thermoplastic film 406 (FIG. 13). As indicated above, the thermoplastic element 500 may preferably be fabricated from the same thermoplastic resin as the low-melt thermoplastic film covering the mating surface of the first component 300 and/or the second component 400. In some examples, the thermoplastic element 500 may be formed of thermoplastic material having a glass transition temperature that may be lower than the melt temperature of the first component 300 and/or the second component 400 to avoid softening the first and/or second component 300, 400 which may otherwise compromise the shape and/or integrity of the first and/or second component 300, 400.

Step 608 of the method 600 may optionally include additively manufacturing the thermoplastic element 500. For example, in FIG. 14, the thermoplastic sheet 506 may be additively manufactured directly on the first thermoplastic film 306 and/or directly on the second thermoplastic film 406 of the respective first component 300 and second component 400. Additive manufacturing techniques may allow for custom-fitting the thermoplastic element 500 directly onto the first component 300 and/or the second component, or directly onto the thermoplastic films 306, 406 of the respective first and/or second component 300, 400. Additive manufacturing directly onto the first and/or second component 300, 400 may reduce the complexity of tooling required to align the first and second component 300, 400 during the process of assembling the first component 300 and the second opponent 400. In any of the embodiments disclosed herein wherein the thermoplastic film on the first and/or second component 300, 400 is a layer of epoxy adhesive, the method may include additively manufacturing the thermoplastic element 500 directly onto the layer of epoxy adhesive. Any one of the above-described techniques for additive manufacturing may be implemented for additively manufacturing the thermoplastic element 500 directly onto the first component 300 and/or the second component, or onto the first and/or second thermoplastic film 306, 406.

Figure 15:
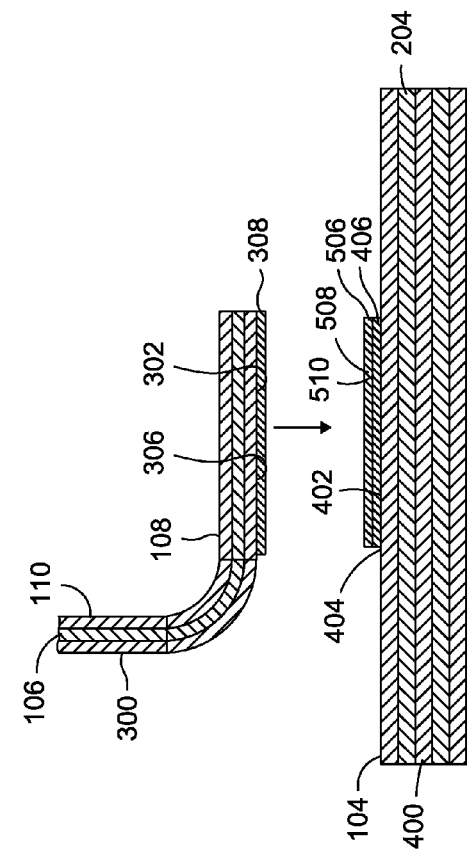
FIG. 15 is an exploded side view of the first component and the second component with the thermoplastic sheet positioned therebetween.

Step 610 of the method 600 of FIG. 5 may include assembling the first component 300 and the second component 400 with the thermoplastic element 500. For example, the method 600 may include assembling the first component 300 and the second component 400 with the thermoplastic sheet 506 sandwiched therebetween. In this regard, the first thermoplastic film 306 and the second thermoplastic film 406 may be positioned in face-to-face contact with the respective first sheet surface 508 and second sheet surface 510 of the thermoplastic sheet 506 as shown in FIG. 13. FIG. 13 illustrates an example of a separately-formed thermoplastic sheet 506 positioned between the first component 300 and the second component 400 prior to assembling the components in face-to-face contact with the sheet surfaces 508, 510 of the thermoplastic sheet 506. FIG. 15 illustrates an example of an additively manufactured thermoplastic sheet 506 directly manufactured onto the second thermoplastic film 406 of the second component 400. In an embodiment, the method may include additively manufacturing a portion of the thermoplastic sheet 506 on one of the components 300, 400, and additively manufacturing a remaining portion of the thermoplastic sheet 506 on the remaining component 300, 400, and then assembling the components 300, 400 together such that the two portions of thermoplastic sheet 506 are placed in face-to-face (not shown) contact with one another. The method may optionally include fabricating assembly tooling 528 (FIG. 16) to hold the components 300, 400 in fixed relation to one another in the assembled state.

Step 612 of the method 600 of FIG. 5 may include heating the thermoplastic element 500, the first thermoplastic film 306, and/or the second thermoplastic film 406 to the glass transition temperature of the thermoplastic element 500, the first thermoplastic film 306, and/or the second thermoplastic film 406. In an embodiment, the thermoplastic element 500 and the first and second thermoplastic films 306, 406 may be formed of the same material in which case the thermoplastic element 500 and the first and second thermoplastic films 306, 406 may have the same glass transition temperature. If the thermoplastic element 500 is formed of a different material than the first thermoplastic film 306 and/or second thermoplastic film 406, then the temperature that may be required for fusing together the components 300, 400 may be the highest of the glass transition temperatures of the thermoplastic element 500 and first and second thermoplastic film 306, 406. In some examples, the thermoplastic element 500, the first thermoplastic film 306, and/or the second thermoplastic film 406 may be heated to a temperature below approximately 500 degrees F.

For embodiments where the first component 300 and/or the second component 400 are formed of thermoplastic material, the temperature at which the thermoplastic element 500 and first and second thermoplastic films 306, 406 are heated may be maintained below the lowest melt temperature of the first component 300 and the second component 400. In some embodiments, the thermoplastic element 500, the first thermoplastic film 306, and/or the second thermoplastic film 406 may be heated by placing the assembly of the first and second component 300, 400 and the thermoplastic element 500 in an autoclave or an oven. In other examples, the first thermoplastic film 306, and/or the second thermoplastic film 406 may be heated by assembly tooling 528 (FIG. 16) holding the components 300, 400 in fixed position relative to one another. Heat may also be applied using infrared heating, radiation heating, hot-air heating, or other heating methods.

Step 614 of the method 600 of FIG. 5 may include applying compactive pressure 524 to the thermoplastic element 500, the first thermoplastic film 306, and the second thermoplastic film 406 during the heating thereof. FIG. 16 illustrates an example of the localized application of compactive pressure 524 to a thermoplastic sheet 506 using tooling positioned on opposite sides of the first and second component 300, 400. The compactive pressure 524 may be applied by mechanical means such as with the press (not shown), for example, to apply compactive pressure 524 to the area of the thermoplastic sheet 506 and the first and second thermoplastic film 306, 406. However, compactive pressure 524 may be applied by vacuum bagging or by other means. The compactive pressure 524 may be applied in a manner compressing the thermoplastic sheet 506 sandwiched between the first component 300 and the second component 400. In an embodiment, the compactive pressure 524 may be applied at a level that causes or facilitates the fusing of the thermoplastic sheet 506 with the first and second thermoplastic film 306, 406. The compactive pressure 524 applied to the thermoplastic sheet 506 and first and second thermoplastic film 306, 406 may be less than the consolidation pressure 522 for co-consolidating the thermoplastic prepreg 206 with the thermoplastic film. For example, the compactive pressure 524 may be less than 100 psi.

Step 616 of the method 600 of FIG. 5 may include fusing together the thermoplastic element 500, the first thermoplastic film 306, and the second thermoplastic film 406 in response to the application of heat and compactive pressure 524. In some examples, heat may be applied to initially soften the thermoplastic element 500 and/or the first and second thermoplastic films 306, 406. Compactive pressure 524 may be applied before and/or during the application of heat, or when the thermoplastic element 500 and the first and second thermoplastic films 306, 406 reach their glass transition temperature. Optionally, compactive pressure 524 may be continuously applied after heat is removed and the thermoplastic element 500 and the first and second thermoplastic films 306, 406 are actively and/or passively cooled below the glass transition temperature. The fusing together of the thermoplastic element 500 and the first and second thermoplastic film 306, 406 may result in the formation of the thermoplastic joint 112 joining the first component 300 to the second component 400. After fusing together and cooling of the thermoplastic element 500 and the first and second thermoplastic films 306, 406, the assembly tooling 528 may be removed resulting in an integrated structural assembly 100 shown in FIG. 17.

Referring to FIG. 18, in some embodiments, one or more of the components may include a radiused surface. For example, in FIG. 18, the first mating surface 302 of the first component 300 may include a first radius surface 304 at the transition between the flange 108 and the web 110. When the first component 300 is assembled with the generally planar second component 400, a wedge-shaped gap (not shown) may occur at the location of the first radius surface 304. It may be desirable to fill the wedge-shaped gap with a thermoplastic radius filler 512 (FIG. 21) to improve the strength of the thermoplastic joint 112 bonding the first component 300 to the second component 400. Although the first radius surface 304 is shown having a convex shape of generally constant radius, the first radius surface 304 may be formed as a non-constant radius. Even further, the first component 300 may include an angled surface or a faceted surface that may result in a wedge-shaped gap with the generally planar second surface, and requiring a thermoplastic radius filler 512 to fill the gap to improve the strength of the thermoplastic joint 112 bonding the first component 300 to the second component 400.

The presently disclosed method provides a means for forming a thermoplastic element 500 as a thermoplastic radius filler 512 to fill the wedge-shaped gap between the first component 300 and second component 400. For example, the thermoplastic radius filler 512 may be formed to match the contour of the first radius surface 304 of the first component 300 and the generally planar second mating surface 402 of the second component 400. An example of a thermoplastic radius filler 512 can be seen in FIGS. 21-22 which is shown having a pair of radius filler side surfaces 514 and a radius filler base surface 516. At least one of the radius filler side surfaces 514 that may each have a concave shape that may substantially match a convex shape of the first radius surface 304 of the first component 300. The radius filler base surface 516 may be generally flat and/or contoured to match the second contour 404 of the second mating surface 402.

In FIG. 18, the method of producing a thermoplastic element 500 as a thermoplastic radius filler 512 may include scanning the first radius surface 304 of a first component 300 using a scanner 520. In some embodiments, the first mating surface 302 may include a first thermoplastic film 308 and the first radius surface 304 may be devoid of a thermoplastic film 308. In other embodiments, the first mating surface 302 may be devoid of a first thermoplastic film 308 and the first radius surface 304 may include a thermoplastic film 308. Regardless of the presence or absence of the thermoplastic film 308 on the first mating surface 302 or the first radius surface 304, the scanner may generate contour data representing the first of the first radius surface 304. The method may additionally include scanning the contour of the second mating surface 402 to generate contour data. Although the contour of the second mating surface 402 is shown as being generally planar, the second contour 404 may have any shape, without limitation, and is not limited to a planar shape. A scanner 520 may scan the second contour 404 and may generate contour data representing the second contour 404. The contour data of the first radius surface 304 and the contour data of the second mating surface 402 may be used to generate a computer model 530 of the thermoplastic radius filler 512 similar to the example shown in FIG. 20.

Referring to FIG. 19, in some embodiments of the first component 300, the first thermoplastic film 308 may be applied to the generally planar first mating surface 302 and may extend in a continuous manner over a portion of the first radius surface 304, or over a substantial entirety of the first radius surface 304. In such embodiments, the method may include using a scanner 520 in any manner such as described above to scan the thermoplastic film 308 and generate contour data of the first radius surface 304 and the first mating surface 302. The scanner 520 may again be used to scan the second contour 404 of the second component 400 and generate contour data in a manner as described above. The contour data of the first mating surface 302 and first radius surface 304 may be combined with the contour data of the second mating surface 402 to generate a computer model 530 of the thermoplastic element 500 that integrally combines a thermoplastic sheet 506 with the thermoplastic radius filler 512 similar in configuration to the thermoplastic radius filler 512 shown in FIG. 24. As described in greater detail below, the unitary thermoplastic element 500 of FIG. 24 may be assembled with the first component 300 and the second component 400 and fused to form a thermoplastic joint 112 having an integral radius filler.

Referring to FIG. 20, the computer model 530 generated by the scanner data may be used to fabricate a thermoplastic radius filler 512 using additive or subtractive manufacturing in any one of the methods described above for producing a thermoplastic sheet 506. For example, the computer model 530 may be used to fabricate a thermoplastic radius filler 512 using subtractive manufacturing such as machining techniques. In one example, the thermoplastic radius filler 512 may be machined from bulk material. Alternatively, the thermoplastic radius filler 512 may be molded or cast using a mold having a contour that substantially duplicates the contours of the computer model 530.

Referring to FIG. 21, in some embodiment, the thermoplastic radius filler 512 may the additively manufactured directly onto the second component 400. For example, the thermoplastic radius filler 512 may be additively manufactured onto the second thermoplastic film 406 of the second component 400. Alternatively, the thermoplastic radius filler 512 may be additively manufactured onto a portion of the second component 400 that is devoid of the second thermoplastic film 406. Any suitable additive manufacturing technique (e.g., three-dimensional printing, stereolithography, etc.) may be implemented for directly fabricating the thermoplastic radius filler 512 onto the second component 400. Although not shown, the thermoplastic radius filler 512 may optionally be additively fabricated directly onto the first radius filler of the first component 300. As indicated above, additively manufacturing the thermoplastic radius filler 512 directly onto the first and/or second component 300, 400 may advantageously reduce or eliminate the need for separate tooling to align the first and second component 300, 400 during the assembly process.

Referring to FIG. 22, shown is an illustration of the process of assembling the first component 300 to the second component 400. The structural assembly 100 includes the additively-manufactured thermoplastic radius filler 512. However, as indicated above, the thermoplastic radius filler 512 may be subtractively-manufactured or produced as a separate component, and then assembled with the first component 300 and the second component 400 similar to the process illustrated in FIG. 13 and described above.

Referring to FIG. 23, shown is an embodiment of a structural assembly 100 including the first component 300 joined to the second component 400. In an assembly process similar to the process described above and illustrated in FIG. 16-17, compactive pressure 524 and/or heat may be applied to the first component 300 and the second component 400 in FIG. 23. Compactive pressure 524 may be applied by mechanical means such as with a press (not shown), vacuum bagging, or any one of a variety of other means for applying pressure to the thermoplastic sheet 506. A radius block (not shown) or a vacuum bag (not shown) may optionally be laterally applied against the exposed radius filler side surface 514 of the thermoplastic radius filler 512 during the application of compactive pressure 524. Heat may be applied before, during, or after the application of compactive pressure 524. Heat may be applied in a manner and at a temperature resulting in the fusing together of the thermoplastic films of the first and second component 300, 400 and optionally to fuse portions of the first and/or second thermoplastic film 308, 406 with portions of the thermoplastic radius filler 512 that are in contact with the thermoplastic film 308, 406.

Referring to FIG. 24, shown is an embodiment of a thermoplastic element 500 comprised of a thermoplastic radius filler 512 and a thermoplastic sheet 506 integrally formed as a unitary structure 518. As indicated above, the integral thermoplastic sheet 506/thermoplastic radius filler 512 may be formed using the contour data generated during the scanning of the first component 300 and the second component 400. FIG. 25 illustrates the assembly of the integral thermoplastic sheet 506/thermoplastic radius filler 512 with the first component 300 and the second component 400. The assembly process may be similar to that described above with regard to the thermoplastic sheet 506 illustrated in FIG. 13. Alternatively, the integral thermoplastic sheet 506/thermoplastic radius filler 512 may be additively-manufactured directly onto the second thermoplastic film 406 of the second component 400 similar to the additive manufacturing of the thermoplastic radius filler 512 described above. Heat and compactive pressure 524 may be applied to fuse the first and second component 300, 400 with the integral thermoplastic sheet 506/thermoplastic radius filler 512.

FIG. 26 illustrates the implementation of the thermoplastic joining process for joining back-to-back L-shaped stiffeners (e.g. first components 300) to a skin (e.g., second component 400). As shown, the opposing radius filler side surfaces 514 of the thermoplastic radius filler 512 are in contact with the opposing first radius surfaces 304 of the back-to-back L-shaped stiffeners. FIG. 27 illustrates an embodiment of an integrated structural assembly 100 including a thermoplastic joint 112 with thermoplastic radius filler 512 joining a Z-shaped stiffener (e.g., a first component 300) to a skin (e.g., a second component 400). FIG. 28 illustrates an integrated structural assembly 100 including a thermoplastic joint 112 having a pair of thermoplastic radius fillers 512 and joining a hat-shaped stiffener to a skin. As may be appreciated, the above-described thermoplastic joining process is not limited to joining the examples of first and second component 300, 400 shown in the Figures. In this regard, the thermoplastic joining process may be implemented for joining two or more components of any size, shape, and configuration, without limitation.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of joining components, comprising the steps of:
providing a first component having a first mating surface, the first mating surface having a first contour;
providing a second component having a second mating surface to be joined to the first mating surface, the second mating surface having a second contour; and
scanning at least one of the first mating surface and the second mating surface to respectively determine the first contour and the second contour;
additively manufacturing, based on the scanning, a unitary solid thermoplastic element directly onto at least one of the first component and the second component prior to assembly with a remaining one of the first component and the second component, the thermoplastic element having at least one of a first element surface and a second element surface respectively substantially matching the first contour and the second contour.

2. The method of claim 1, wherein:
the first contour of the first mating surface has a mismatch with the second contour of the second mating surface.

3. The method of claim 1, wherein the step of additively manufacturing the thermoplastic element comprises:
additively manufacturing a thermoplastic sheet having at least one of a first sheet surface and a second sheet surface substantially matching the first contour and the second contour.

4. The method of claim 1, wherein the step of additively manufacturing the thermoplastic element comprises:
producing the thermoplastic element with at least one of opposing first and second element surfaces substantially matching a respective contour of a first thermoplastic film and a second thermoplastic film respectively applied to the first mating surface and the second mating surface.

5. The method of claim 1, wherein the first mating surface includes a first radius surface, the step of additively manufacturing the thermoplastic element comprises:
additively manufacturing a thermoplastic radius filler having at least one of a radius filler side surface and a radius filler base surface substantially matching a respective contour of the first radius surface and the second mating surface.

6. The method of claim 5, wherein the step of additively manufacturing the thermoplastic element comprises:
integrally forming a thermoplastic sheet with the thermoplastic radius filler; and
the thermoplastic sheet having at least one of a first sheet surface and a second sheet surface substantially matching the first contour and the second contour.

7. The method of claim 1, wherein the step of scanning includes:
scanning using a digital scanner, a camera, a coordinate-measuring machine, or any combination thereof.

8. The method of claim 1, wherein the step of additively manufacturing the thermoplastic element directly onto at least one of the first component and the second component comprises:
additively manufacturing the thermoplastic element directly onto at least one of a first thermoplastic film of the first component or a second thermoplastic film of the second component.

9. The method of claim 1, further comprising the step of:
assembling the first component and the second component with the thermoplastic element sandwiched therebetween; and
fusing together the thermoplastic element, a first thermoplastic film, and a second thermoplastic film to form a thermoplastic joint joining the first component to the second component.

10. The method of claim 9, wherein the step of fusing comprises:

heating at least one of the thermoplastic element, the first thermoplastic film, and/or the second thermoplastic film to at least a glass transition temperature thereof.

11. The method of claim 9, wherein the thermoplastic element includes a thermoplastic sheet, the step of fusing includes:
compressing a thermoplastic sheet sandwiched between the first component and the second component.

12. The method of claim 9, wherein the step of additively manufacturing the thermoplastic element includes:
additively manufacturing the thermoplastic element from material having a glass transition temperature that is lower than a melt temperature of the first component and/or the second component.

13. The method of claim 9, wherein the step of additively manufacturing the thermoplastic element includes:
additively manufacturing the thermoplastic element from material that is substantially similar to the material of the first thermoplastic film and/or the second thermoplastic film.

14. The method of claim 1, wherein:
the first component and/or the second component is formed of a thermoset material or a thermoplastic material.

15. The method of claim 1, wherein the step of providing the first component and the second component comprises:
forming the first component and/or the second component by co-consolidating a thermoplastic film with a stack of plies of thermoplastic prepreg.

16. The method of claim 1, wherein the step of providing the first component and the second component comprises:
forming the first component and/or the second component by co-curing a thermoplastic film with a stack of plies of thermoset prepreg.

17. The method of claim 1, wherein the step of additively manufacturing comprises one of:
three-dimensional printing, stereolithography, and direct digital manufacturing.

18. A method of joining components, comprising the steps of:
providing a first component having a first thermoplastic film applied to a first mating surface;
providing a second component having a second thermoplastic film applied to a second mating surface;
scanning the first thermoplastic film and the second thermoplastic film to determine a contour thereof;
additively manufacturing, based on the scanning, a unitary solid thermoplastic element directly onto at least one of the first thermoplastic film and the second thermoplastic film prior to assembly with a remaining one of the first component and the second component, the thermoplastic sheet being formed from material that is substantially similar to the first thermoplastic film and/or the second thermoplastic film, the thermoplastic sheet having at least one of a first sheet surface and a second sheet surface respectively matching the contour of the first mating surface and the second mating surface;
assembling the first component and the second component with the thermoplastic sheet sandwiched therebetween;
applying heat and compactive pressure to the thermoplastic sheet, the first thermoplastic film, and/or the second thermoplastic film; and
fusing together the thermoplastic sheet, the first thermoplastic film, and the second thermoplastic film to join the first component to the second component to form a structural assembly.

19. The method of claim 18, wherein the step of additively manufacturing comprises one of:
three-dimensional printing, stereolithography, and direct digital manufacturing.

20. A method of joining components, comprising the steps of:
providing a first component having a first thermoplastic film applied to a first mating surface, the first mating surface including a first radius surface;
providing a second component having a second thermoplastic film applied to a second mating surface;
scanning the first thermoplastic film and the second thermoplastic film to determine a contour thereof;
additively manufacturing, based on the scanning, a unitary solid thermoplastic radius filler directly onto the second mating surface prior to assembly with the first component, the radius filler having a radius filler side surface substantially matching a contour of the first radius surface;
assembling the first component and the second component with the thermoplastic radius filler sandwiched therebetween;
applying heat and compactive pressure to the thermoplastic radius filler, the first thermoplastic film, and/or the second thermoplastic film; and
fusing together the first thermoplastic film, the second thermoplastic film, and/or the thermoplastic radius filler to join the first component to the second component to form a structural assembly.

* * * * *